United States Patent
Hung

(10) Patent No.: US 10,753,529 B2
(45) Date of Patent: Aug. 25, 2020

(54) SUPPORTING DEVICE FOR A DISPLAY

(71) Applicant: Modernsolid Industrial Co., Ltd., Taichung (TW)

(72) Inventor: Chin Jui Hung, Taichung (TW)

(73) Assignee: ModernSolid Industrial Co., Ltd., Taichung (TW)

(*) Notice: Subject to any disclaimer, the term of this patent is extended or adjusted under 35 U.S.C. 154(b) by 0 days.

(21) Appl. No.: 16/011,082

(22) Filed: Jun. 18, 2018

(65) Prior Publication Data
US 2019/0003631 A1    Jan. 3, 2019

(30) Foreign Application Priority Data

Jun. 30, 2017  (TW) ............................. 106209546 A

(51) Int. Cl.
| F16M 11/04 | (2006.01) |
| F16M 11/10 | (2006.01) |
| F16M 13/02 | (2006.01) |
| F16M 11/20 | (2006.01) |

(52) U.S. Cl.
CPC ......... *F16M 11/041* (2013.01); *F16M 11/105* (2013.01); *F16M 11/2035* (2013.01); *F16M 11/2064* (2013.01); *F16M 13/022* (2013.01); *F16M 11/04* (2013.01); *F16M 2200/06* (2013.01); *F16M 2200/063* (2013.01)

(58) Field of Classification Search
USPC ....... 248/917, 918, 919, 920, 921, 922, 923, 248/130, 133, 152; 361/679.06, 679.09
See application file for complete search history.

(56) References Cited

U.S. PATENT DOCUMENTS

| 6,505,988 B1 | 1/2003 | Oddsen, Jr. | |
| 7,264,212 B2 | 9/2007 | Hung | |
| 7,338,022 B2 | 3/2008 | Hung | |
| 8,100,372 B2* | 1/2012 | Vlies | F16M 11/10 248/220.1 |
| 8,215,596 B2* | 7/2012 | Duan | F16M 11/10 16/337 |
| 8,251,325 B2* | 8/2012 | Molter | F16M 11/105 248/221.12 |
| 8,366,060 B2 | 2/2013 | Hung | |

(Continued)

*Primary Examiner* — Alfred J Wujciak
(74) *Attorney, Agent, or Firm* — Perkins Coie LLP

(57) ABSTRACT

The present disclosure relates to a supporting device which is suitable for installing a display and comprises a support assembly, an adapter, two upper securing screws, and two lower securing screws. The adapter includes a base plate installed on the support assembly and used for connecting to the display. The base plate has a top edge, a bottom edge, a front face, a back face, at least one pair of hanging slots disposed on the top edge and extending from the front face to the back face, and two slot holes extending from the front face to the back face, wherein the slot holes respectively correspond to the at least one pair of hanging slots. The upper securing screws are respectively and detachably passed through and embedded in the at least one pair of hanging slots and are used for connecting to the back side of the display. The lower securing screws are respectively and detachably passed through and embedded in the slot holes and are used for connecting to the back side of the display.

18 Claims, 16 Drawing Sheets

(56) References Cited

U.S. PATENT DOCUMENTS

| | | | | |
|---|---|---|---|---|
| 9,004,431 B2* | 4/2015 | Huang | ................... | F16M 11/10 248/121 |
| 2004/0118987 A1* | 6/2004 | Matko | ................ | B60R 11/0235 248/282.1 |
| 2004/0232298 A1* | 11/2004 | Bremmon | .............. | F16M 11/10 248/281.11 |
| 2004/0262474 A1* | 12/2004 | Boks | .................... | F16M 11/041 248/276.1 |
| 2006/0284037 A1* | 12/2006 | Dittmer | ................ | F16M 11/048 248/285.1 |
| 2013/0119219 A1* | 5/2013 | Mifsud | ................ | F16M 13/022 248/276.1 |
| 2013/0161466 A1* | 6/2013 | Lau | ........................ | F16M 13/02 248/288.11 |

* cited by examiner

SUPPORTING DEVICE FOR A DISPLAY

CROSS-REFERENCE TO RELATED APPLICATION

This application claims the benefit under 35 U.S.C. § 119 to Application Ser. No. 106209546, filed in the Taiwan Patent Office on Jun. 30, 2017, entitled "Supporting Device," which is incorporated by reference herein in its entirety.

RELATED FIELD

The present disclosure relates to a supporting device, particularly to a supporting device for installing a display.

BACKGROUND

An existing supporting device for installing a display 10 is shown in FIGS. 1, 2 and 3. The supporting device includes an axle seat 12 which is connected to a support arm 11, a coupling seat 13 which is disposed on the axle seat 12, an installation seat 14 which is detachably disposed on the coupling seat 13 and is connected to the display 10, and a quick release structure 15 which is releasably disposed between the coupling seat 13 and the installation seat 14.

The coupling seat 13 has an embedding portion 131 which is connected to the installation seat 14, and a fitting portion 132 which is connected to the quick release structure 15. The installation seat 14 has a slightly disc-shaped base edge 141, four locking portions 142 which extend from the base edge 141, and four locking bolts 143 which pass through the locking portions 142 respectively and are screwed to the locking bolt 143 on the back side of the display 10. The base edge 141 has a semi-circular curved slot 144 for the embedding portion 131 of the coupling seat 13 to be embedded in, and a circular hole 145. The quick release structure 15 has a curved thimble 151 which is pivoted to the base edge 141 and is used for embedding the fitting portion 132, and a pull button 152, which can be pressed and pulled, disposed on a front end of the curved thimble 151 and is able to be embedded in the circular hole 145 of the installation seat 14.

Through an arrangement that the installation seat 14 and the quick release structure 15 coordinate with the coupling seat 13, the display 10 can be installed on the coupling seat 13 or be taken down from the coupling seat 13 by such a supporting device. However, such a supporting device requires the coupling seat 13, the installation seat 14 and the quick release structure 15 coordinating with each other to be disposed between the axle seat 12 and the display 10 to form an embedding structure, which is fairly difficult in structural design and substantially increases the manufacturing cost.

SUMMARY

Therefore, one object of the present disclosure is to provide a supporting device which is simple in structure and can reduce the manufacturing cost.

Thus, a supporting device of the present disclosure is suitable for installing a display, the device comprising a support assembly, an adapter, two upper securing screws, and two lower securing screws. The adapter includes a base plate installed on the support assembly and used for connecting to the display; the base plate has a top edge, a bottom edge opposite to the top edge, a front face for connecting the top edge to the bottom edge, a back face for connecting the top edge to the bottom edge and opposite to the front face, at least one pair of hanging slots disposed on the top edge and extending from the front face to the back face, and two slot holes that extend from the front face to the back face and lower than the at least one pair of hanging slots on a Z-axis; and the slot holes respectively correspond to the at least one pair of hanging slots.

The upper securing screws respectively and detachably pass through and are embedded in at least one pair of hanging slots, and are used for connecting to the back side of the display.

The lower securing screws respectively and detachably pass through and are embedded in the slot holes, and are used for connecting to the back side of the display.

According to the effect of the supporting device of the invention, by utilizing a design that the upper securing screws and the lower securing screws coordinate with the adapter, the display can be installed on the adapter or be taken down from the adapter, so that the structural design for hanging the display can be effectively simplified, and the manufacturing cost can be substantially reduced.

BRIEF DESCRIPTION OF THE DRAWINGS

Other features and effects of the present disclosure will be clearly presented in the embodiments with reference to drawings.

DETAILED DESCRIPTION

Figure 1:
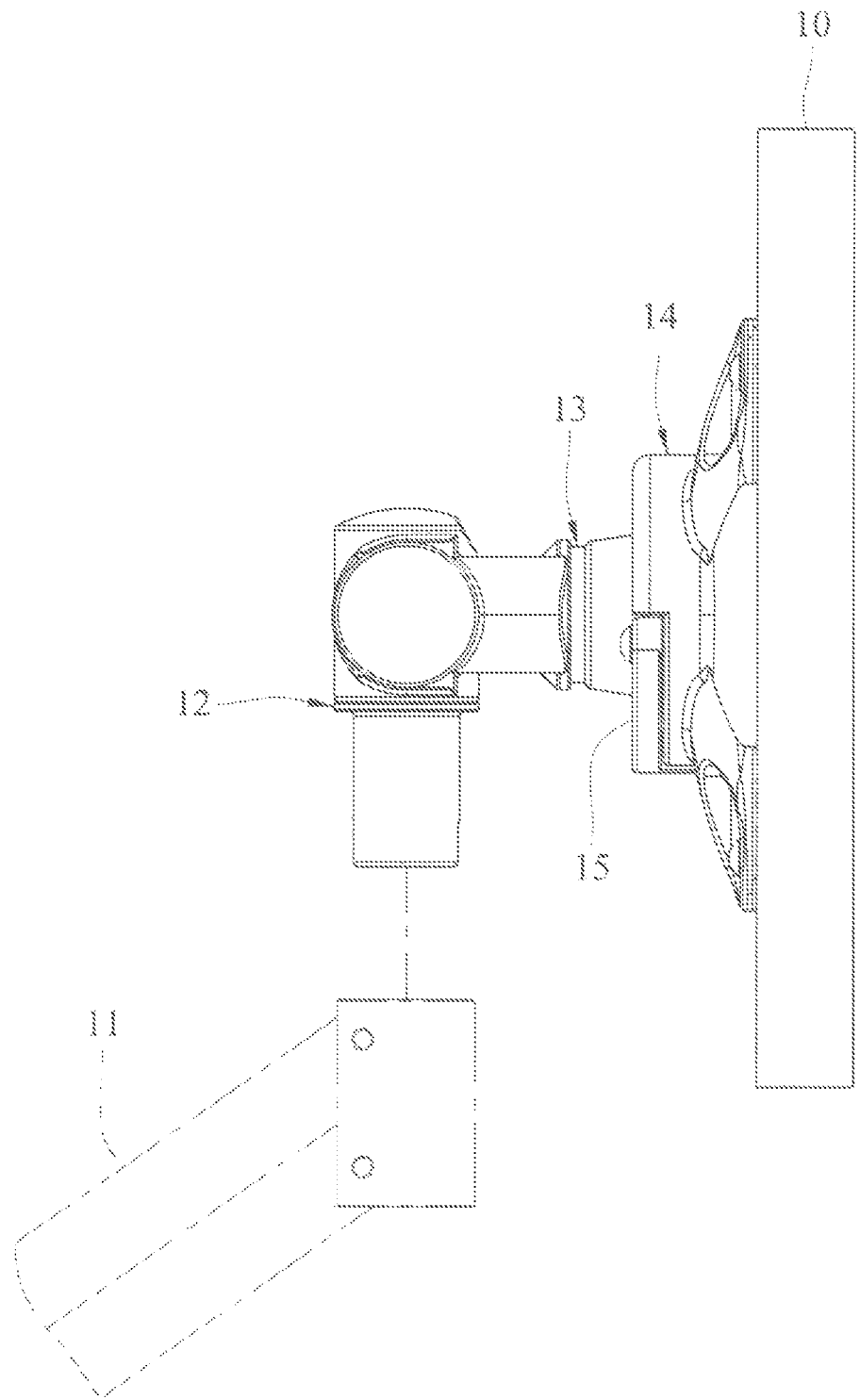
FIG. 1 is a side view illustrating a supporting device in the prior art.
Figure 2:
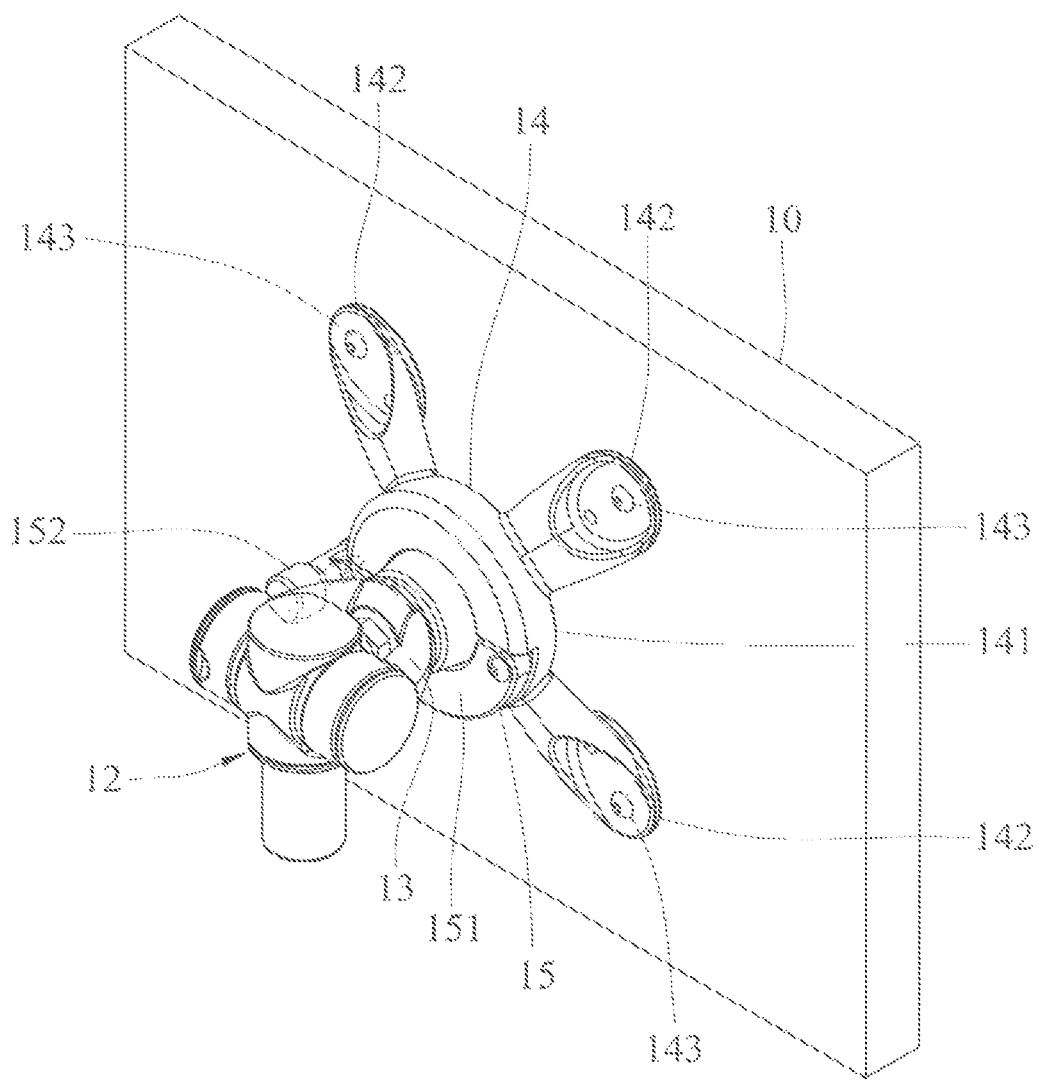
FIG. 2 is an assembly perspective view illustrating a display installed on the supporting device of FIG. 1.
Figure 3:
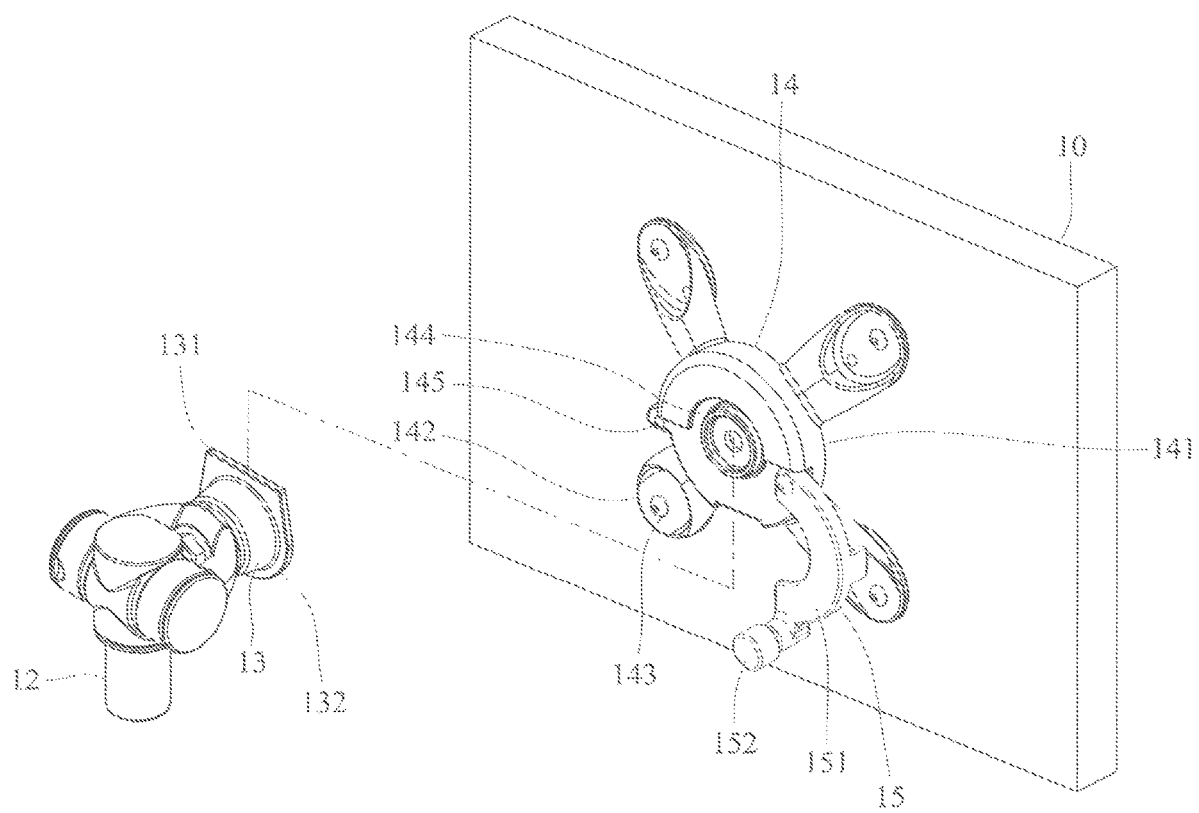
FIG. 3 is a partially exploded perspective view of the supporting device of FIG. 1.
Figure 4:
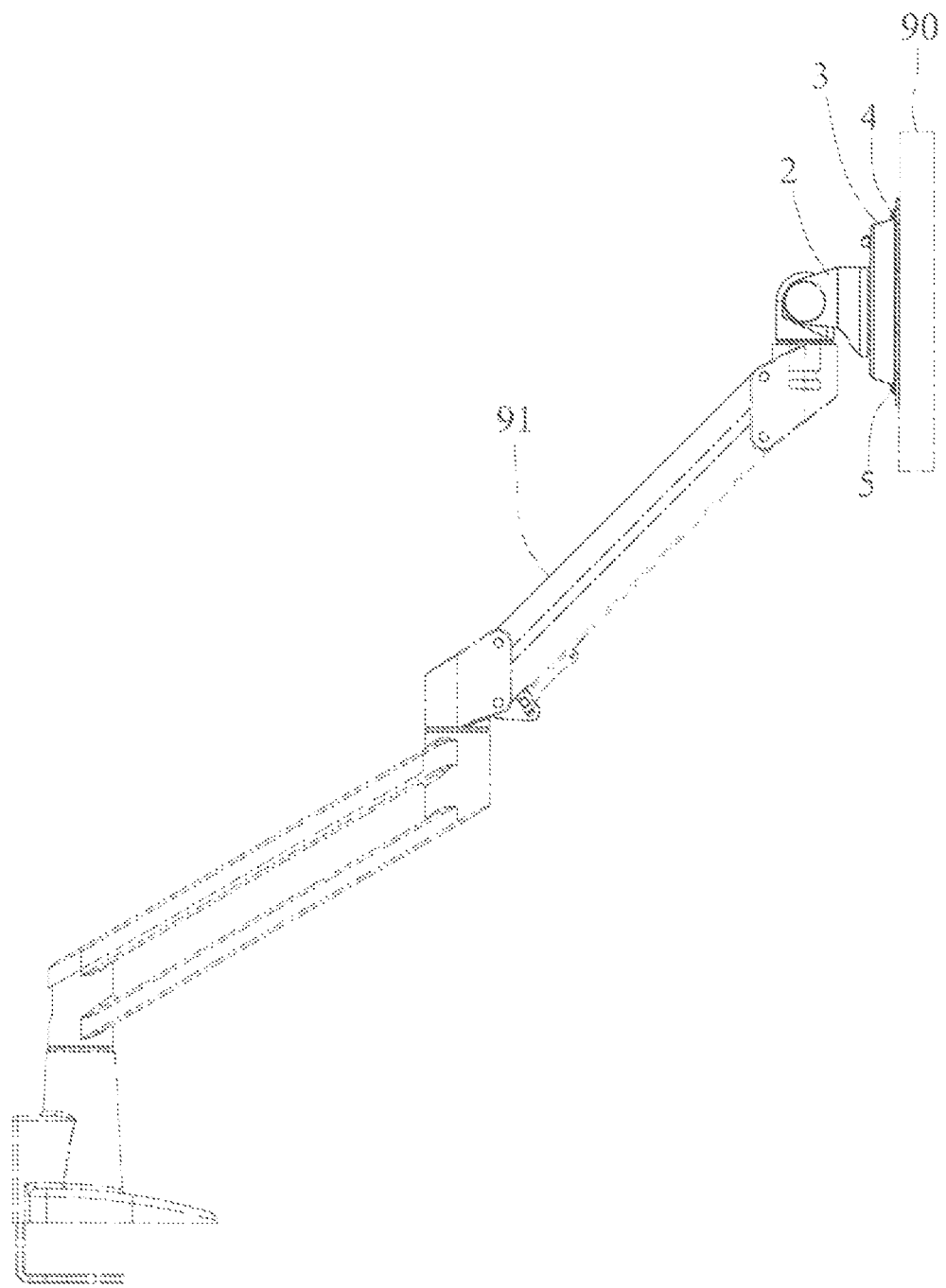
FIG. 4 is a schematic side view illustrating that a first embodiment of the supporting device of the present disclosure is installed on a support arm and is connected to a display.
Figure 5:
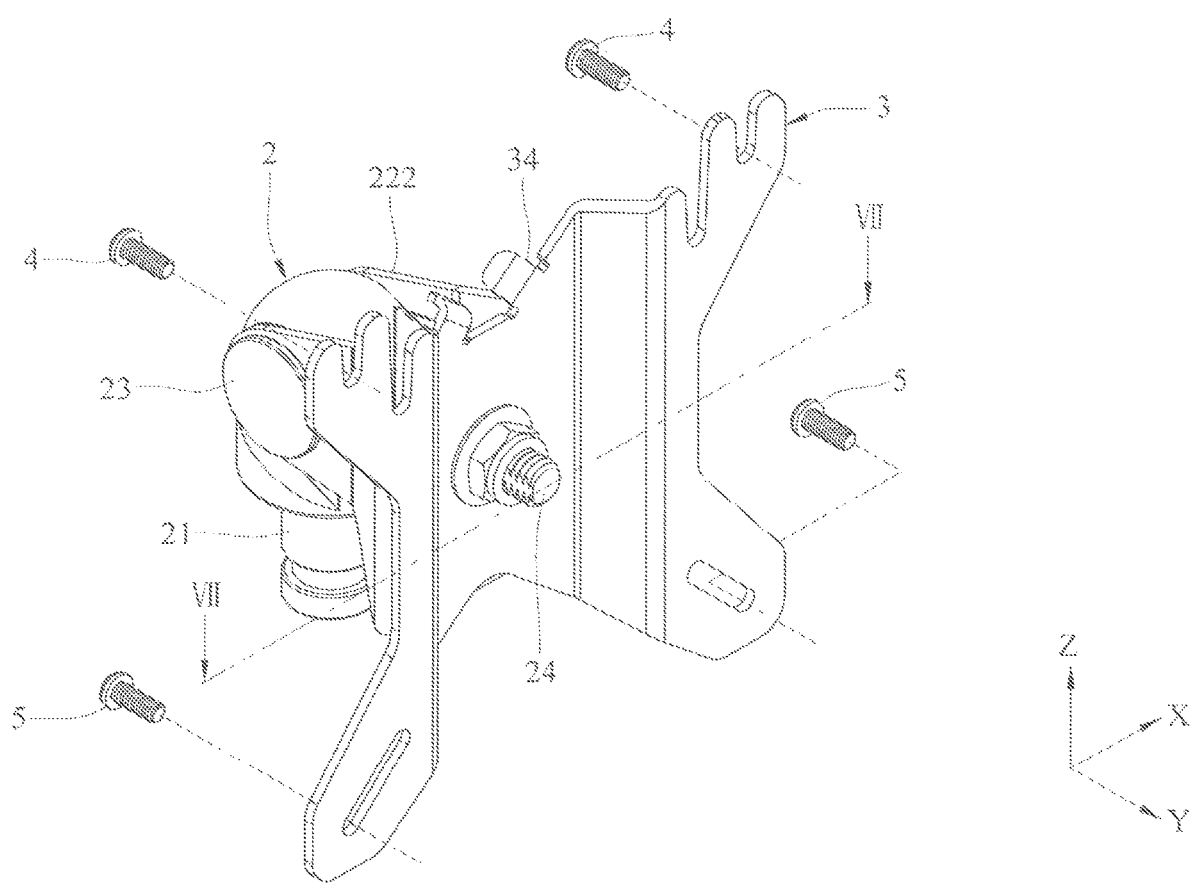
FIG. 5 is a partially exploded perspective view of the first embodiment.

With reference to FIGS. 4 and 5, a first embodiment of the supporting device of the present disclosure is suitable for installing a display 90 and can be installed to a support arm 91, wherein the supporting device comprises a support assembly 2, an adapter 3, two upper securing screws 4, and two lower securing screws 5.

Figure 6:
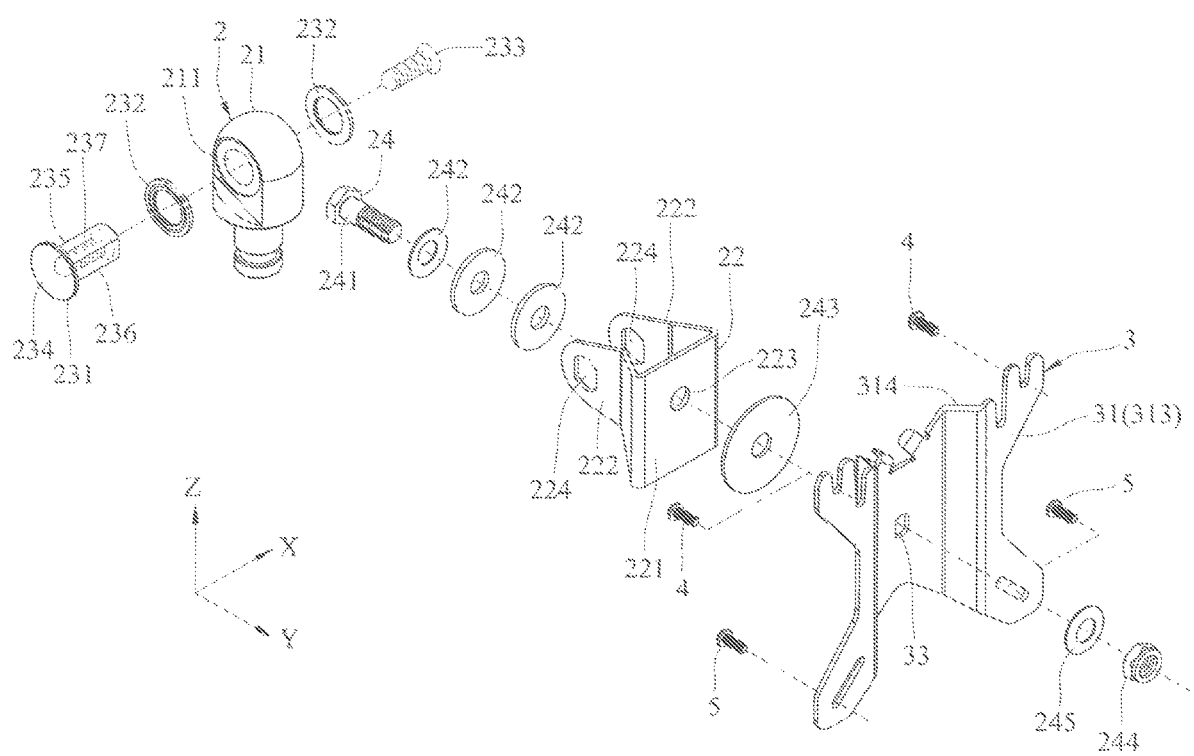
FIG. 6 is an exploded perspective view of the first embodiment.
Figure 7:
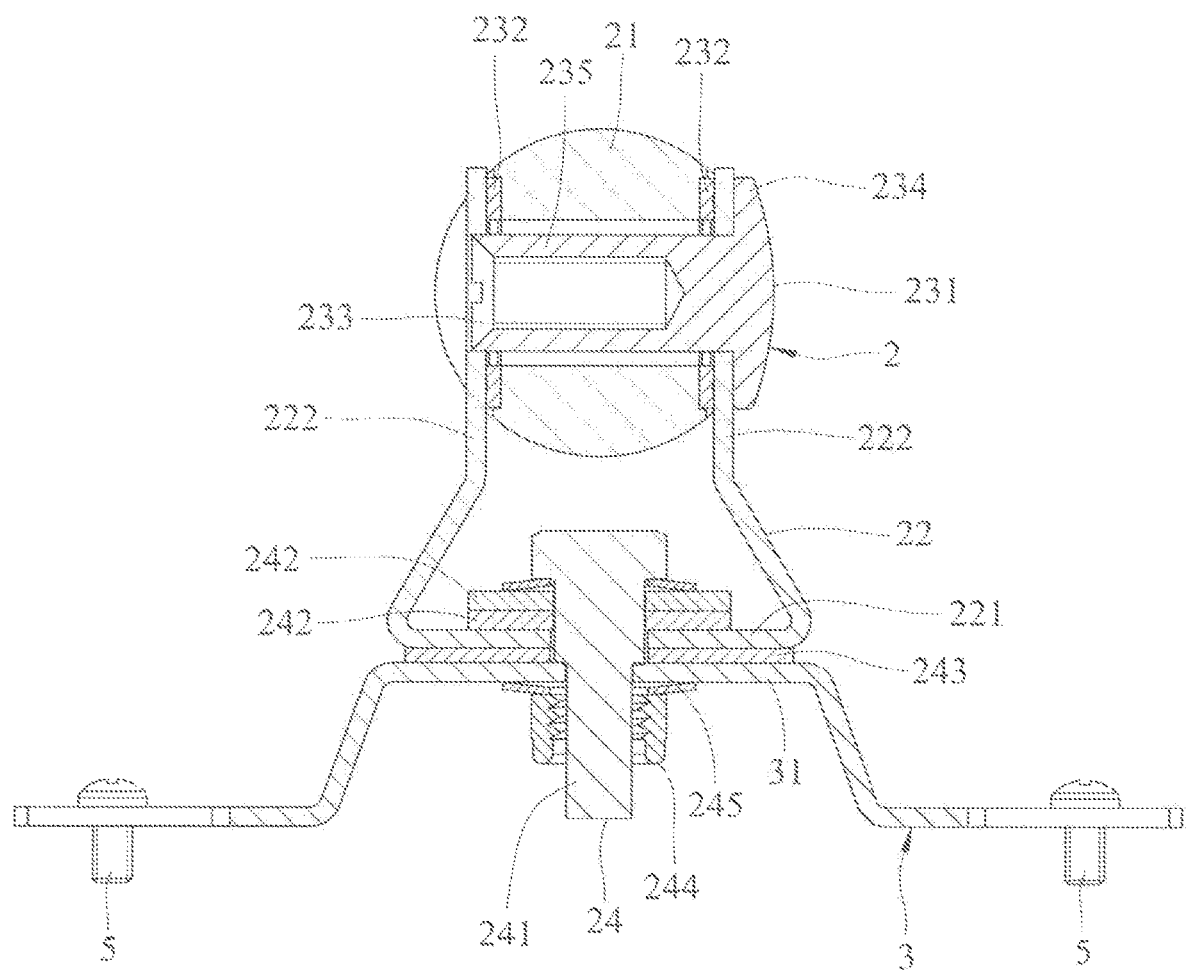
FIG. 7 is a sectional view taken along the line VII-VII of FIG. 5.

With reference to FIGS. 5, 6 and 7, the support assembly 2 includes a support 21 which is connected to the support arm 91 (see FIG. 4), a mount 22, an adjustment bolt assembly 23 and a screw and nut assembly 24. The support 21 has a bore hole 211 extending along an X-axis and has a circular cross-sectional shape.

The mount 22 is disposed on the support 21 and is connected to the adapter 3, and the mount 22 has a base edge 221 and two side edges 222 which are spaced apart and extend rearward from the base edge 221 to the support 21. The base edge 221 has a fastening hole 223 which has a circular cross-sectional shape. Each side edge 222 has a connecting hole 224 which corresponds to the bore hole 211 of the support 21 and has a non-circular cross-sectional shape.

The adjustment bolt assembly 23 is detachably disposed in the bore hole 211, and the side edges 222 of the mount 22 are adjustably positioned on the support 21 by the adjustment bolt assembly 23. The adjustment bolt assembly 23 has a pin 231, two gaskets 232, and an adjustment bolt 233 which is screwed to the pin 231. The pin 231 has a head portion 234 and a body portion 235 which extends from the head portion 234 and passes through the connecting hole 224 of the side edges 222 and the bore hole 211 of the support 21. The gaskets 232 are respectively disposed between the side edges 222 and the support 21, and the adjustment bolt 233 is screwed to the body portion 235 of the pin 231 and is used for adjustably positioning the side edges 222 of the mount 22 on the support 21. It should be noted that, in the first embodiment, the cross-sectional shape of the body portion 235 is non-circular and corresponds to the cross-sectional shape of the connecting hole 224 of the side edges 222. The body portion 235 has two oppositely disposed flat surfaces 236, and two oppositely disposed curved surfaces 237 which are connected between the flat surfaces 236. With a design that the cross-sectional shapes of the body portion 235 of the pin 231 and the connecting hole 224 of the mount 22 are all non-circular and coordinate with each other, the mount 22 is ensured to rotate about the pin 231 with respect to the support 21 after the adjustment bolt 233 is unscrewed.

Figure 8:
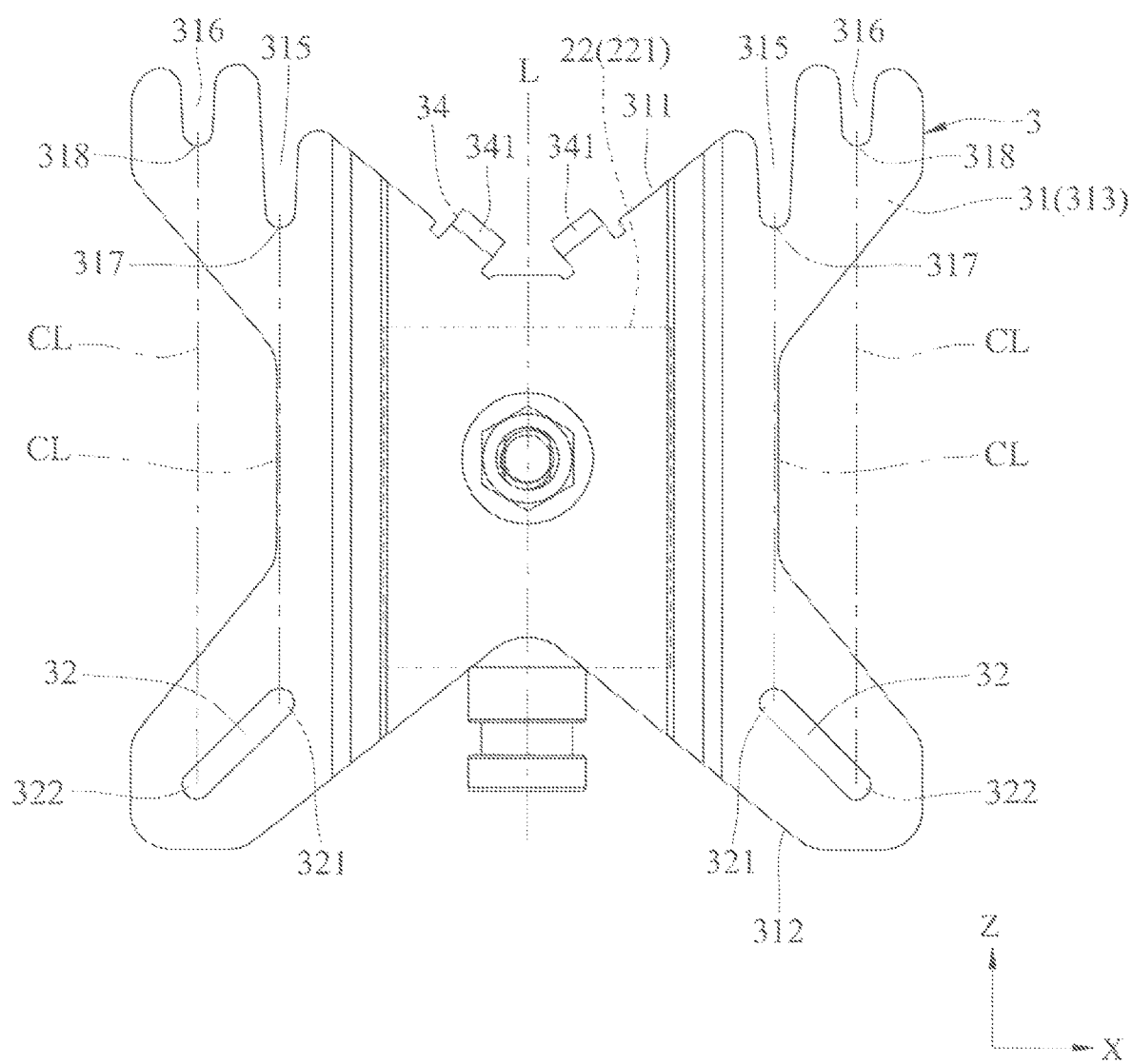
FIG. 8 is a front view of the first embodiment.

With reference to FIGS. 6, 7 and 8, the adapter 3 is adjustably positioned on the base edge 221 of the mount 22 through the screw and nut assembly 24. The adapter 3 includes a base plate 31 which is connected to the support assembly 2 and is used for connecting to the display 90 and a stopper portion 34. The adapter 3 has a reference axis L which is parallel to a Z-axis and passes through the base plate 31. The base plate 31 has a top edge 311, a bottom edge 312 opposite to the top edge 311, a front face 313 for connecting the top edge 311 to the bottom edge 312, a back face 314 for connecting the top edge 311 to the bottom edge 312 and opposite to the front face 313, two pairs of hanging slots 315 and 316 spaced apart on the top edge 311 and extending from the front face 313 to the back face 314, two slot holes 32 extending from the front face 313 to the back face 314 and are lower than the two pairs of hanging slots 315 and 316 on the Z-axis, and a securing hole 33 extending from the front face 313 to the back face 314 and having a non-circular cross-sectional shape. Each hanging slot 315 and 316 has a center line CL extending along the Z-axis. A distance between the pair of hanging slots 315 on the X-axis is shorter than a distance between the pair of hanging slots 316 on the X-axis, and the slot bottom 317 of the pair of hanging slots 315 is lower than the slot bottom 318 of the pair of hanging slots 316 on the Z-axis. The slot holes 32 are disposed relatively inclined. Each slot hole 32 has an inner slot portion 321 and an outer slot portion 322, and each slot hole 32 extends from the inner slot portion 321 to the outer slot portion 322 downward and outward. The inner slot portions 321 of the slot holes 32 respectively correspond to the pair of hanging slots 315, and the center lines CL of the pair of hanging slots 315 respectively intersect with the inner slot portions 321 of the slot holes 32, while the outer slot portions 322 of the slot holes 32 respectively correspond to the pair of hanging slots 316, and the center lines CL of the pair of hanging slots 316 respectively intersect with the outer slot portions 322 of the slot holes 32. The stopper portion 34 is disposed on the top edge 311 of the base plate 31 and has two stopper pieces 341 which are symmetrical to each other and inclined oppositely to the reference axis L. Each stopper piece 341 extends from the top edge 311 of the base plate 31 upward, and then extends rearward to the top of the base edge 221 of the mount 22.

The screw and nut assembly 24 of the support assembly 2 is detachably disposed on the base edge 221 of the mount 22 along a Y-axis and is connected to the base plate 31 of the adapter 3 so as to enable the adapter 3 to be adjustably connected to the base edge 221 of the mount 22. The screw and nut assembly 24 has a screw 241 which passes through the fastening hole 223 of the base edge 221 and the securing hole 33 of the base plate 31, a plurality of gaskets 242 which are sandwiched between the screw 241 and the base edge 221 of the mount 22, a washer 243 which is sandwiched between the base edge 221 and the base plate 31 of the adapter 3, a nut 244 which is screwed to the screw 241, and a spring gasket 245 which is sandwiched between the base plate 31 of the adapter 3 and the nut 244. In the first embodiment, the screw 241 is a screw whose cross-sectional shape is non-circular. The cross-sectional shape of the securing hole 33 corresponds to the cross-sectional shape of the screw 241 of the screw and nut assembly 24, and the adapter 3 is ensured to rotate about the screw 241 with respect to the mount 22 after the nut 244 is unscrewed.

Figure 9:
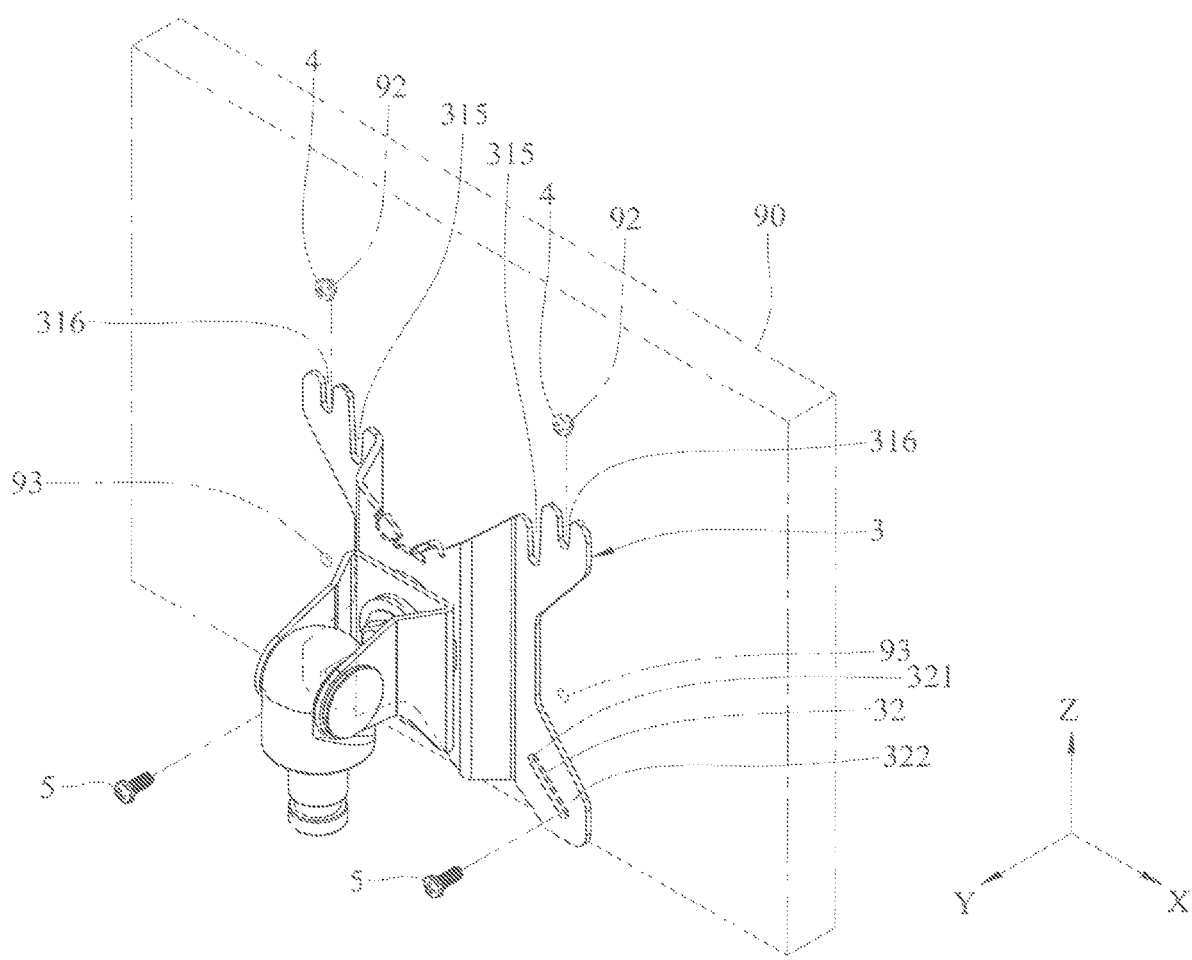
FIG. 9 is an installation diagram illustrating that two upper securing screws of the first embodiment are locked to the back side of the display and are not embedded in an adapter of the first embodiment.
Figure 10:
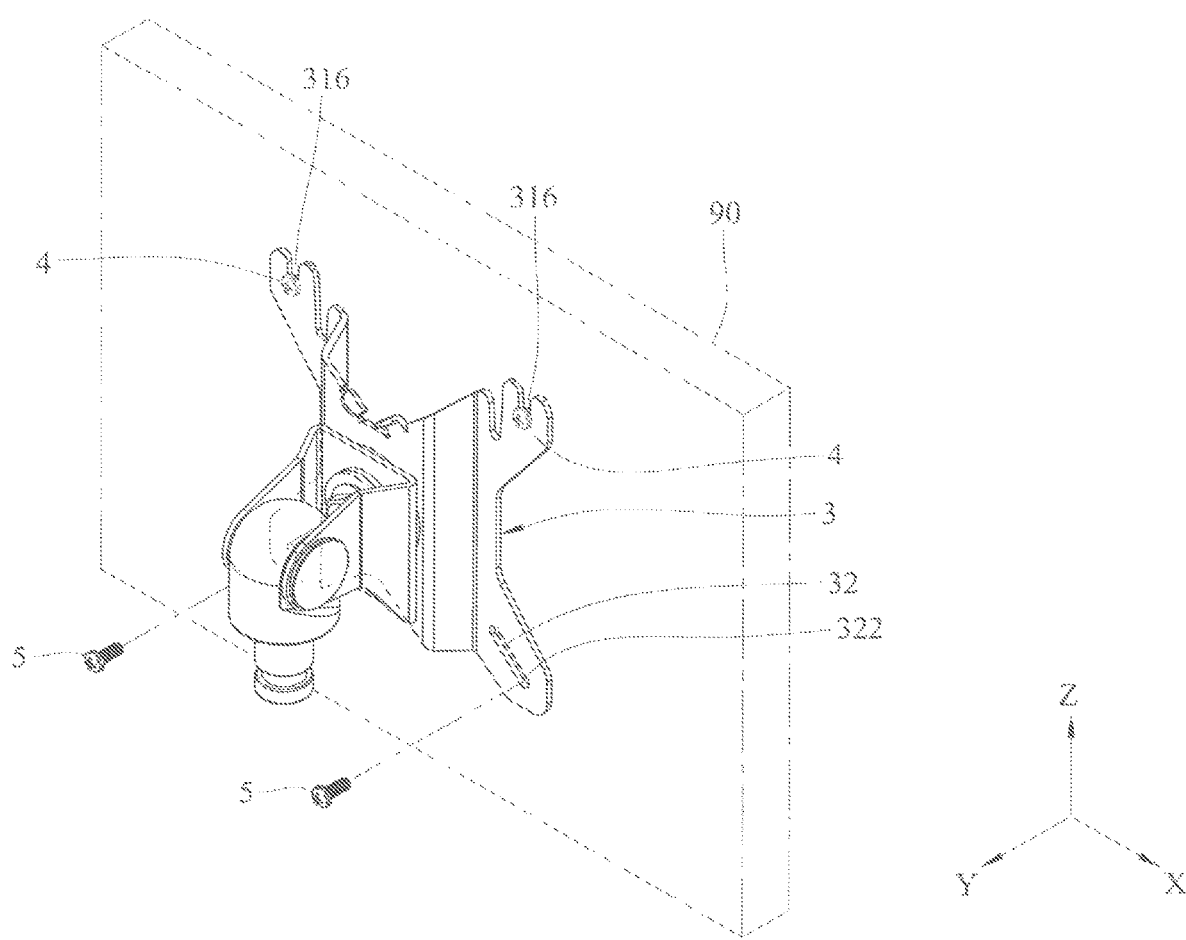
FIG. 10 is a view similar to FIG. 9, illustrating that the upper securing screws are embedded in a pair of hanging slots of the adapter, while two lower securing screws of the first embodiment are still not locked to the adapter.
Figure 11:
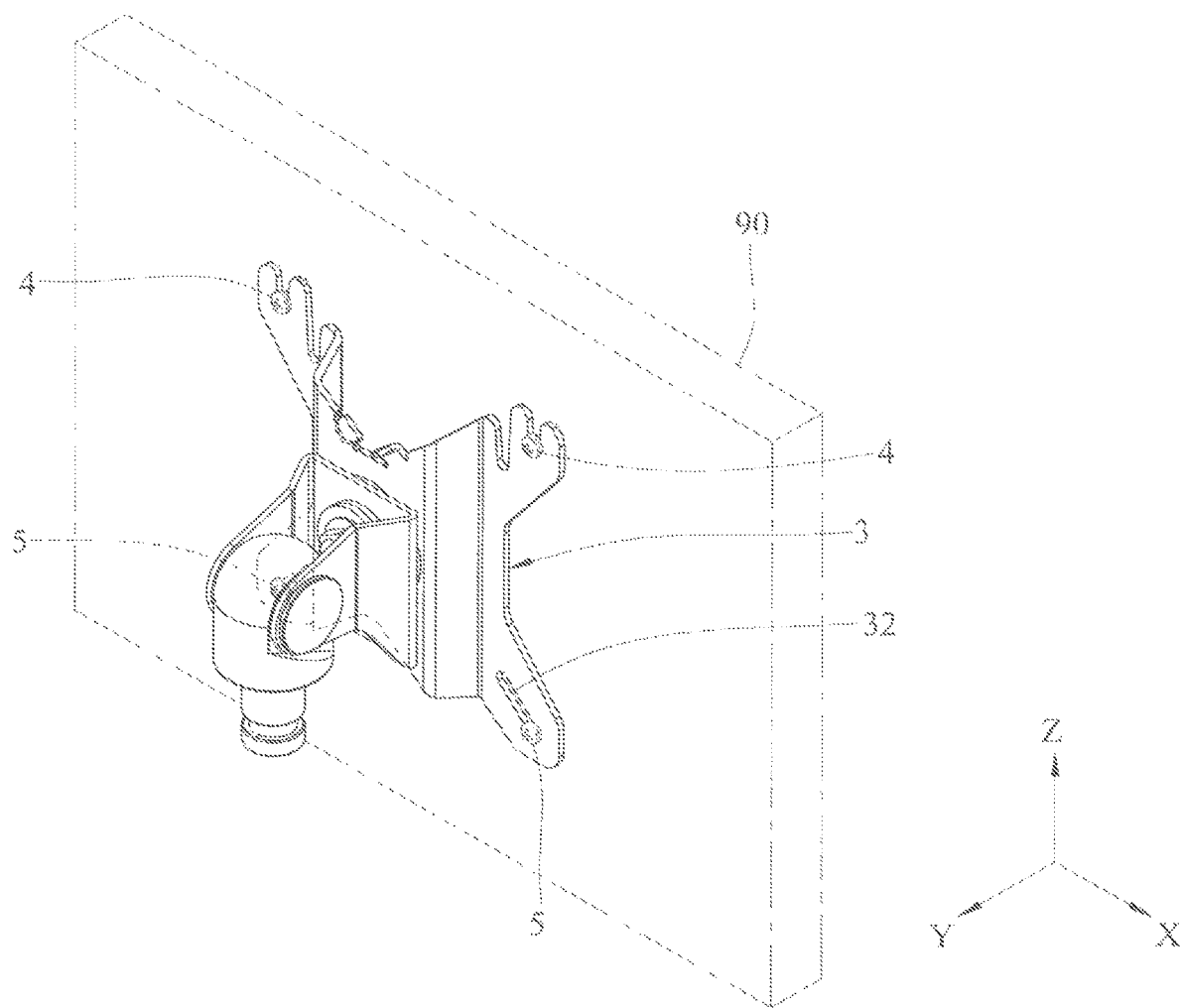
FIG. 11 is a view similar to FIG. 10, illustrating that the lower securing screws are embedded in two slot holes of the adapter and are locked to the display.

With reference to FIGS. 9, 10 and 11, the upper securing screws 4 respectively and detachably pass through and are embedded in the pair of hanging slots 316 and are used for connecting to the back side of the display 90. In the first embodiment, the upper securing screws 4 are embedded in the pair of hanging slots 316 and the upper securing screws are screws.

The lower securing screws 5 respectively and detachably pass through and are embedded in the slot holes 32 and are used for connecting to the back side of the display 90. In the first embodiment, the lower securing screws 5 are embedded in the outer slot portions 322 of the slot holes 32 and the lower securing screws 5 are screws.

Thereby, as shown in FIG. 9, when the display 90 is to be installed to the first embodiment, the installation of the display 90 may be performed by the following steps: firstly, the upper securing screws 4 are locked in two screw holes 92 on the back side of the display 90 respectively, then the corresponding pair of hanging slots 316 are selected according to the positions of the screw holes 92 on the back side of the display 90, and the display 90 is moved downward to the adapter 3; next, as shown in FIG. 10, the upper securing screws 4 are slid and embedded into the pair of hanging slots 316 respectively, to enable the display 90 to be temporarily positioned on the adapter 3 with the support of the upper securing screws 4; finally, as shown in FIG. 11, the lower securing screws 5 are passed into and locked in the two screw holes 93 (see FIG. 9) on the back side of the display 90 through the outer slot portion 322 (see FIG. 10) of the slot holes 32 respectively.

As shown in FIG. 10, conversely, the display 90 is to be taken down from the adapter 3 as long as the following steps are performed: firstly, the lower securing screws 5 are removed; then, as shown in FIG. 9, the display 90 is slid upward to the upper securing screws 4 to separate from the pair of hanging slots 316 of the adapter 3, then the upper securing screws 4 are removed from the display 90 to quickly replace the display 90.

Specifically, when installed on displays 90 of different dimensions, the upper securing screws 4 can certainly be embedded in the pair of hanging slots 315 instead (see FIG. 8) and correspondingly the lower securing screws 5 are embedded in the inner slot portions 321 of the slot holes 32 instead (see FIG. 8).

Figure 12:
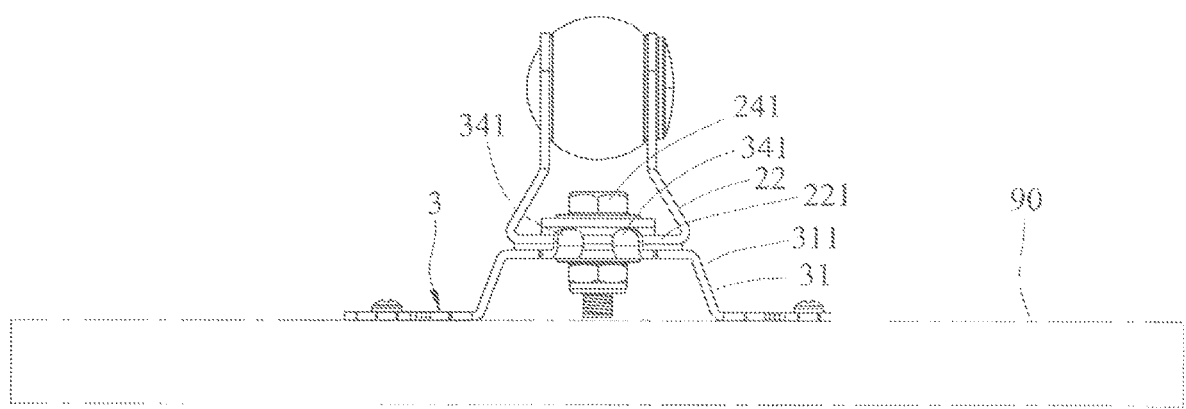
FIG. 12 is a schematic plan view illustrating a stopper portion of the adapter.
Figure 13:
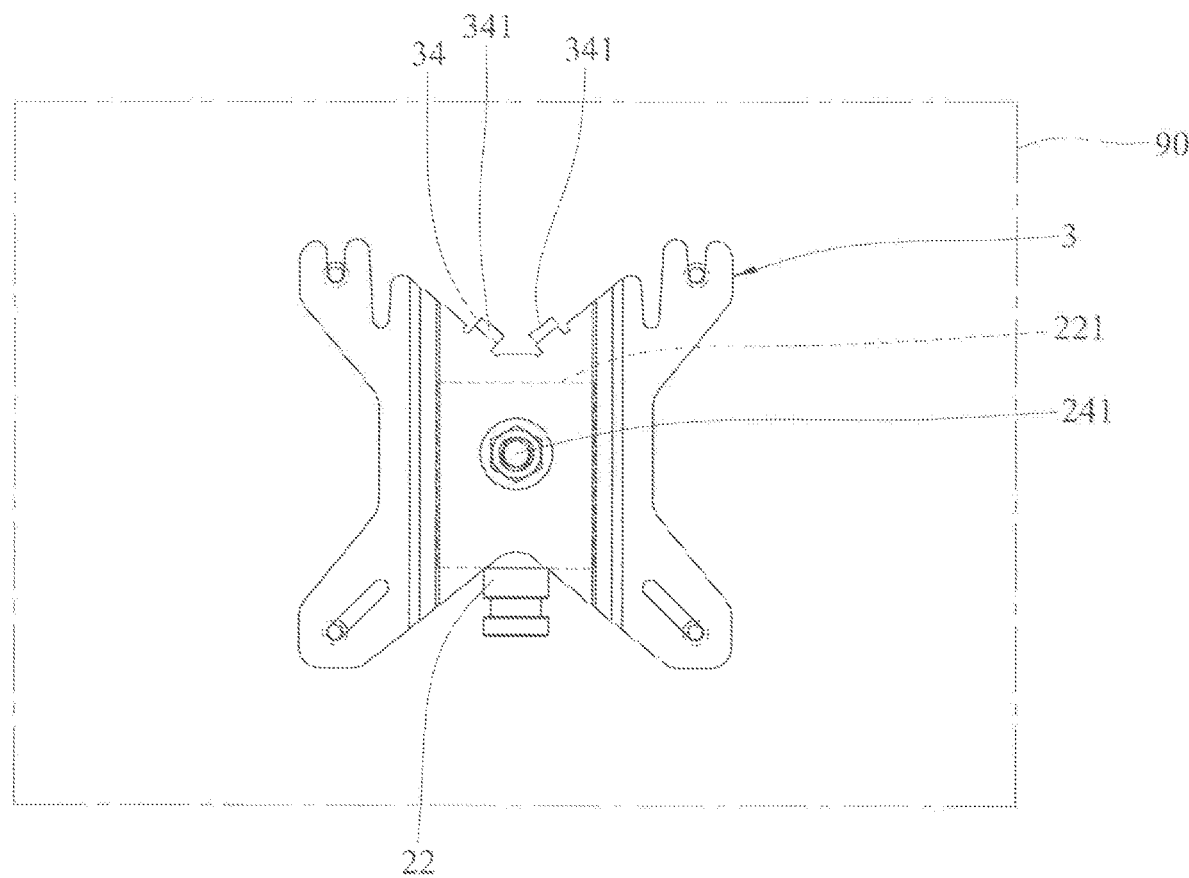
FIG. 13 is a front view of FIG. 12, illustrating the adapter in a horizontal position.
Figure 14:
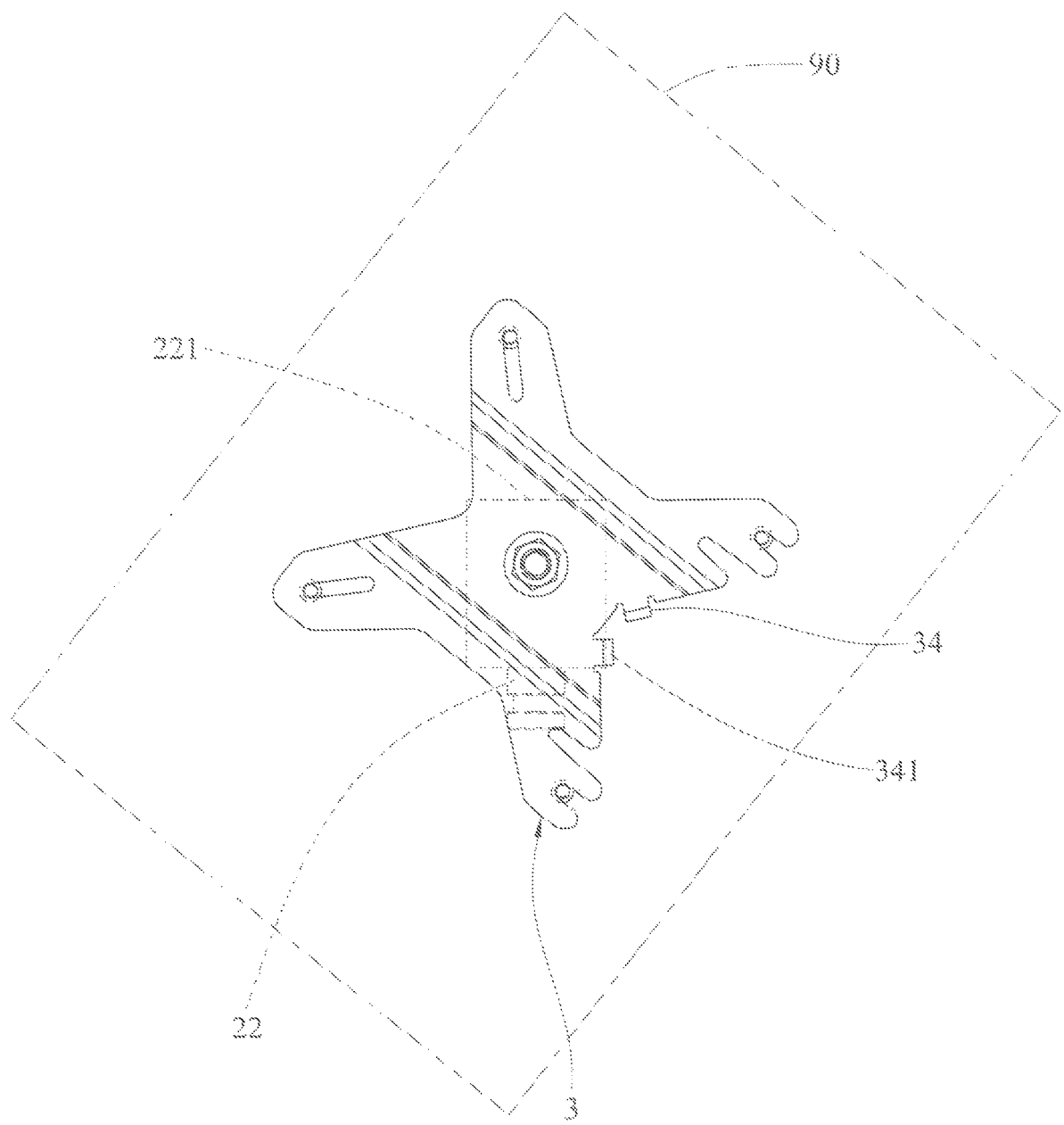
FIG. 14 is a view similar to FIG. 13, illustrating the adapter in an inclined position.

With reference to FIGS. 12, 13 and 14, the adapter 3 is adjusted between a horizontal position (see FIG. 13) and an inclined position (see FIG. 14) with respect to the base edge 221 of the mount 22 centered on the screw 241. When the adapter 3 is in the horizontal position, the stopper pieces 341 of the stopper portion 34 are away from the top edge of the base edge 221 of the mount 22. When the adapter 3 is adjusted to the inclined position, one of the stopper pieces 341 abuts against the lateral edge of the base edge 221 of the mount 22 to prevent the adapter 3 from being excessively rotated. It should be noted that the adapter 3 in FIG. 14 is adjusted through clockwise rotation by way of illustration. It should be understood that the adapter 3 can also be adjusted to the inclined position through anticlockwise rotation. Thereby, the effect that the adapter 3 is limited to only adjustable between the horizontal position and the inclined position is realized.

The advantages of the first embodiment can be concluded as follows, according to the above description:

1. According to the design of the present disclosure that allows the lower securing screws 5 and the upper securing screws 4 to coordinate with the adapter 3, the display 90 can be installed on the adapter 3 or be taken down from the adapter 3. Compared with prior arts, the structural design of the present disclosure for hanging the display 90 is simple and is convenient for manufacturing and can substantially reduce manufacturing cost.

2. According to the design of the present disclosure that allows the stopper pieces 341 of the adapter 3 and the base edge 221 of the mount 22 to block and stop each other, the angle of inclination adjustment of the adapter 3 can be limited to enable the display 90 to keep an inclination state.

Figure 15:
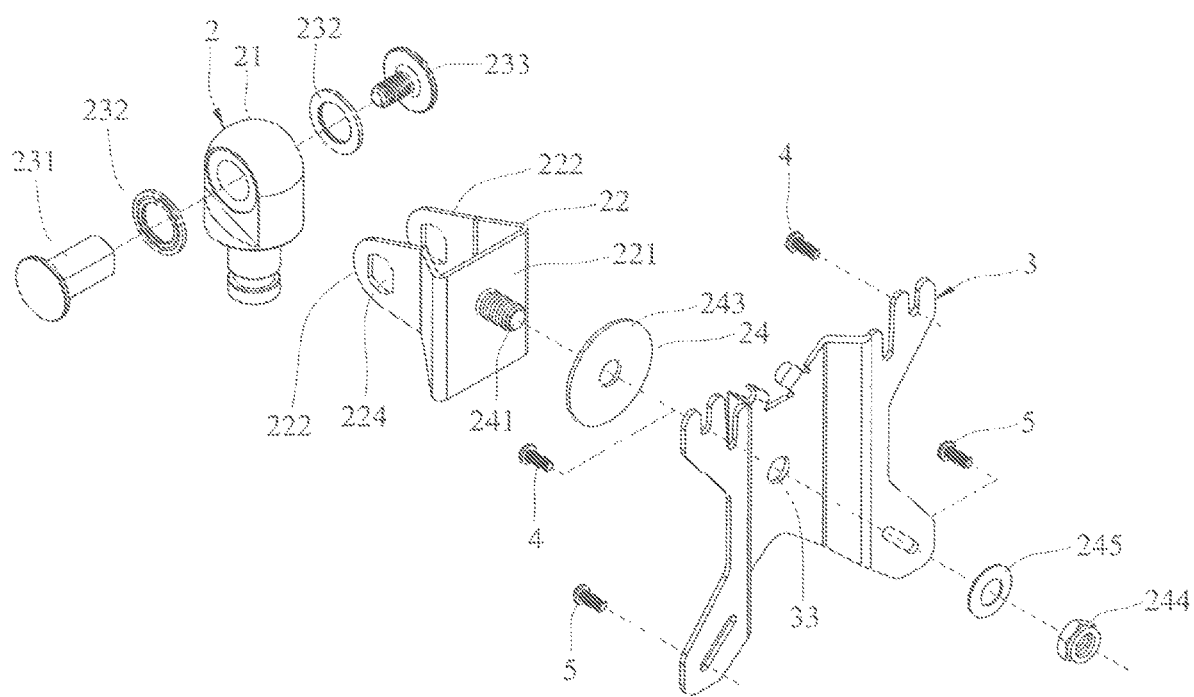
FIG. 15 is a view similar to FIG. 6, illustrating a second embodiment of the supporting device of the present disclosure.
Figure 16:
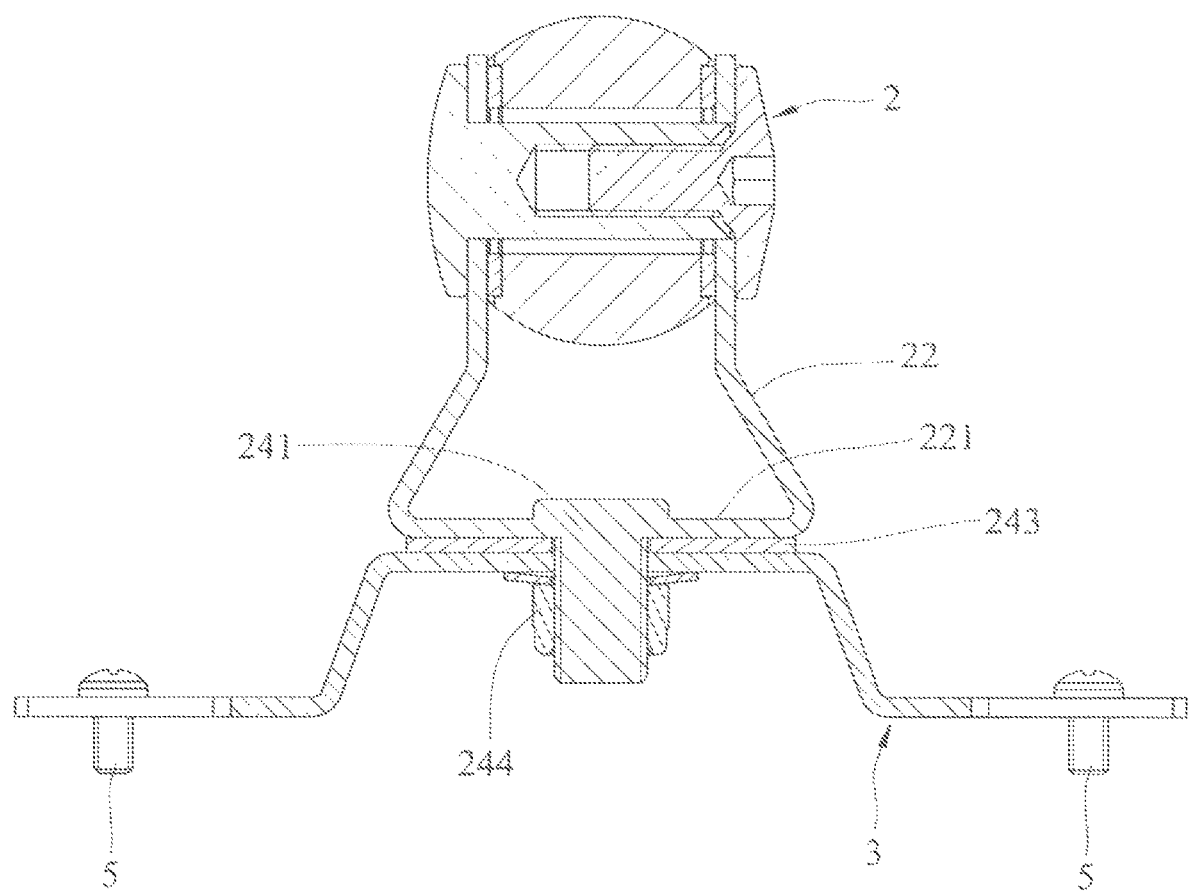
FIG. 16 is a view similar to FIG. 7, illustrating a connection relationship between a screw and nut assembly of a support assembly of the second embodiment and the adapter.

With reference to FIGS. 15 and 16, a second embodiment of the present disclosure is shown that is similar to the first embodiment, with the following differences:

The mount 22 of the support assembly 2 has the base edge 221, the side edges 222, and a threaded locking portion 241 which extends from the base edge 221 and is connected to the securing hole 33 of the adapter 3. The arrangement of fastening hole 223 on the base edge 221 is eliminated.

The screw and nut assembly 24 has the screw 241, the washer 243, the nut 244, and the spring gasket 245, and the arrangement of the gaskets 242 is eliminated.

The cross-sectional shapes of the screw 241 and the securing hole 33 of the adapter 3 are all circular and coordinate with each other.

The screw 241 of the screw and nut assembly 24 is integrally connected to the base edge 221 and passes through the securing hole 33 of the adapter 3. The adapter 3 is adjustably positioned to the base edge 221 of the mount 22 by the screw and nut assembly 24. The adapter 3 is adjusted between the horizontal position and the inclined position with respect to the base edge 221 centered on the screw 241.

Therefore, in addition to achieving the same objects and effects as set forth above with respect to the first embodiment, the number of components in the second embodiment is also reduced through the arrangement that the screw 241 of the screw and nut assembly 24 is integrally connected to the base edge 221.

In view of the above, the supporting device of the present disclosure is not only simple in the structural design for hanging the display 90, but also enables the manufacturing cost to be reduced so that the objects of the present disclosure are reliably realized.

Embodiments described above are merely embodiments of the present disclosure and are not intended to limit the scope of the present disclosure. Any simple equivalent variations or modifications of the present disclosure according to the claims and the contents of the specification of the present disclosure are contemplated within the scope of the present disclosure.

The invention claimed is:

1. A supporting device suitable for installing a display, the supporting device comprising:
   an adapter further comprising a base plate configured to be connected to a display, wherein the base plate further comprises:
      a top edge,
      a bottom edge opposite to the top edge,
      a front face,
      a back face opposite to the front face,
      a first pair of hanging slots disposed on the top edge, wherein each of the first pair of hanging slots penetrate the base plate, and wherein each of the first pair of hanging slots respectively extends to provide an opening in the base plate of the top edge, and
      two slot holes penetrating the base plate at a location on the base plate in closer proximity to the bottom edge than the hanging slots penetrate the base plate, wherein each of the two slot holes is respectively aligned to a portion of each of the first pair of hanging slots in a first direction, wherein the first pair of hanging slots and the slot holes are configured for connecting the base plate to the display,
   wherein the supporting device further comprises a mount connected to the adapter, wherein the mount further comprises:
      a base edge connected to the adapter and
      two side edges spaced apart extending rearward from the base edge,
   wherein the adapter further comprises a stopper portion that is disposed on the top edge of the base plate, wherein the adapter is configured to be adjustably positioned between a first position and a second position with respect to the base edge of the mount, and wherein the stopper portion is away from a top edge of the base edge of the mount when the adapter is in the first position and the stopper portion abuts against a lateral edge of the base edge of the mount when the adapter is in the second position.

2. The supporting device of claim 1, further comprising: a second pair of hanging slots disposed on the top edge.

3. The supporting device according to claim 2, wherein the second pair of hanging slots penetrates the base plate at a location on the base plate, wherein the second pair of hanging slots extends further towards the bottom edge than the first pair of hanging slots.

4. The supporting device according to claim 3, wherein each slot hole comprises an inner slot portion and an outer slot portion, the inner slot portion extending further towards the top edge than the outer slot portion and located on the base plate in closer proximity to the top edge than the outer slot portion,
wherein each slot hole extends diagonally from the inner slot portion to the outer slot portion, wherein each of the second pair of hanging slots is respectively aligned to each of the inner slot portions of the slot holes in the first direction and each of the first pair of hanging slots is respectively aligned to each of the outer slot portions of the slot holes in the first direction.

5. The supporting device according to claim 1, wherein the adapter comprises a reference axis that passes through a center of the base plate in the first direction, wherein the stopper of the adapter comprises two stopper pieces that are symmetrical to each other with respect to the reference axis and diagonally extending toward each other, wherein each stopper piece further extends rearward toward the back face, wherein one of the stopper pieces abuts against the lateral edge of the base edge when the adapter is in the second position.

6. A supporting device suitable for installing a display, the supporting device comprising:
a support assembly further comprising a support and a mount;
an adapter further comprising a base plate configured to be connected to a display, wherein the baseplate further comprises:
a top edge,
a bottom edge opposite to the top edge,
a front face,
a back face opposite to the front face,
a first pair of hanging slots disposed on the top edge, wherein each of the first pair of hanging slots penetrate the base plate, and wherein each of the first pair of hanging slots respectively extends to provide an opening in the base plate at the top edge, and
two slot holes penetrating the base plate at a location on the base plate in closer proximity to the bottom edge than the hanging slots penetrate the base plate, wherein each of the two slot holes is respectively aligned to a portion of each of the first pair of hanging slots in a first direction, wherein the first pair of hanging slots and the slot holes are configured for connecting the base plate to the display,
wherein the mount is disposed on the support and connected to the adapter, wherein the mount further comprises:
a base edge connected to the adapter and
two side edges spaced apart extending rearward from the base edge, wherein the two side edges are adjustably positioned on the support,
wherein the support of the support assembly further comprises:
a bore hole and
an adjustment bolt assembly detachably disposed on the bore hole, and wherein the side edges of the mount are adjustably positioned on the support by the adjustment bolt assembly.

7. The supporting device of claim 6, further comprising: a second pair of hanging slots disposed on the top edge.

8. The supporting device according to claim 7, wherein the second pair of hanging slots penetrates the base plate at a location on the base plate, wherein the second pair of hanging slots extends further towards the bottom edge than the first pair of hanging slots.

9. The supporting device according to claim 8, wherein each slot hole comprises an inner slot portion and an outer slot portion, the inner slot portion extending further towards the top edge than the outer slot portion and located on the base plate in closer proximity to the top edge than the outer slot portion, wherein each slot hole extends diagonally from the inner slot portion to the outer slot portion, wherein each of the second pair of hanging slots is respectively aligned to each of the inner slot portions of the slot holes in the first direction and each of the first pair of hanging slots is respectively aligned to each of the outer slot portions of the slot holes in the first direction.

10. The supporting device according to claim 6, wherein each side edge of the mount comprises a connecting hole corresponding to the support, wherein the adjustment bolt assembly further comprises a pin passing through the connecting holes of the side edges of the mount and the bore hole of the support, wherein a cross-section shape of the pin corresponds to a cross-section shape of the connecting holes of the side edges of the mount.

11. The supporting device according to claim 10, wherein a cross-section shape of the bore hole of the support is circular.

12. The supporting device according to claim 10, wherein the cross-section shape of the connecting holes of the side edges of the mount is non-circular.

13. The supporting device according to claim 10, wherein the cross-section shape of the pin of the adjustment bolt assembly is non-circular.

14. The supporting device according to claim 10, wherein the adjustment bolt assembly further comprises an adjustment bolt, wherein the pin has a body portion passing through the connecting holes of the side edges of the mount and the bore hole of the support, wherein the adjustment bolt is configured to be fixed to the body portion such that the side edges of the mount are adjustably positioned on the support, wherein the body portion further comprises two oppositely disposed flat surfaces and two curved surfaces oppositely disposed and connected to the flat surfaces.

15. The supporting device according to claim 6, wherein the adapter further comprises a stopper portion that is disposed on the top edge of the base plate, wherein the adapter is adjustably positioned on the base edge of the mount and configured to be adjusted between a first position and a second position with respect to the base edge of the mount, wherein the stopper portion is away from a top edge of the base edge of the mount when the adapter is in the first position and the stopper portion abuts against a lateral edge of the base edge of the mount when the adapter is in the second position.

16. The supporting device according to claim 15, wherein the base plate of the adapter further comprises a securing hole extending from the front face to the back face and the support assembly further comprises a screw and nut assembly detachably disposed on the base edge of the mount and connected to the base plate of the adapter.

17. The supporting device according to claim 16, wherein the screw and nut assembly further comprises a screw integrally connected to the base edge of the mount and passing through the securing hole of the base plate, wherein the adapter is adjustably positioned on the base edge of the mount by the screw and nut assembly and the adapter is adjusted between the first position and the second position with respect to the base edge of the mount centered on the screw.

18. The supporting device according to claim 15, wherein the adapter comprises a reference axis that passes through a center of the base plate in the first direction, wherein the stopper of the adapter comprises two stopper pieces that are symmetrical to each other with respect to the reference axis and diagonally extending toward each other, wherein each stopper piece further extends rearward toward the back face, wherein one of the stopper pieces abuts against the lateral edge of the base edge of the mount when the adapter is in the second position.

\* \* \* \* \*